J. G. SCOTT.
STOVE.
APPLICATION FILED JULY 2, 1917.

1,335,760.

Patented Apr. 6, 1920.
3 SHEETS—SHEET 3.

Inventor
James G. Scott
By
Attorneys

UNITED STATES PATENT OFFICE.

JAMES G. SCOTT, OF WASHINGTON, DISTRICT OF COLUMBIA.

STOVE.

1,335,760.      Specification of Letters Patent.      Patented Apr. 6, 1920.

Application filed July 2, 1917. Serial No. 178,056.

*To all whom it may concern:*

Be it known that I, JAMES G. SCOTT, a citizen of the United States, residing at Washington, in the District of Columbia, have invented certain new and useful Improvements in Stoves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to stoves, but more particularly to domestic cooking stoves using gaseous fuel so constructed and arranged that when desired the burners may be employed for heating water and the heat may also be let from the burners to an oven for the purpose of heating the same for baking purposes.

The invention has for its object to provide certain improvements over my copending application, Serial No. 158,288, and to provide certain improvements over my prior U. S. Patents Nos. 1,220,695, 1,220,012 and 1,219,494, and the invention consists in an improved construction for providing a more perfect draft to provide more efficient circulation of the heat so that the action of the stove will be more efficient and the temperature in the oven can be more quickly raised to an effective baking temperature.

Referring to the accompanying drawings—

Like numerals of reference indicate the same parts throughout the several figures, in which—

Figure 1:
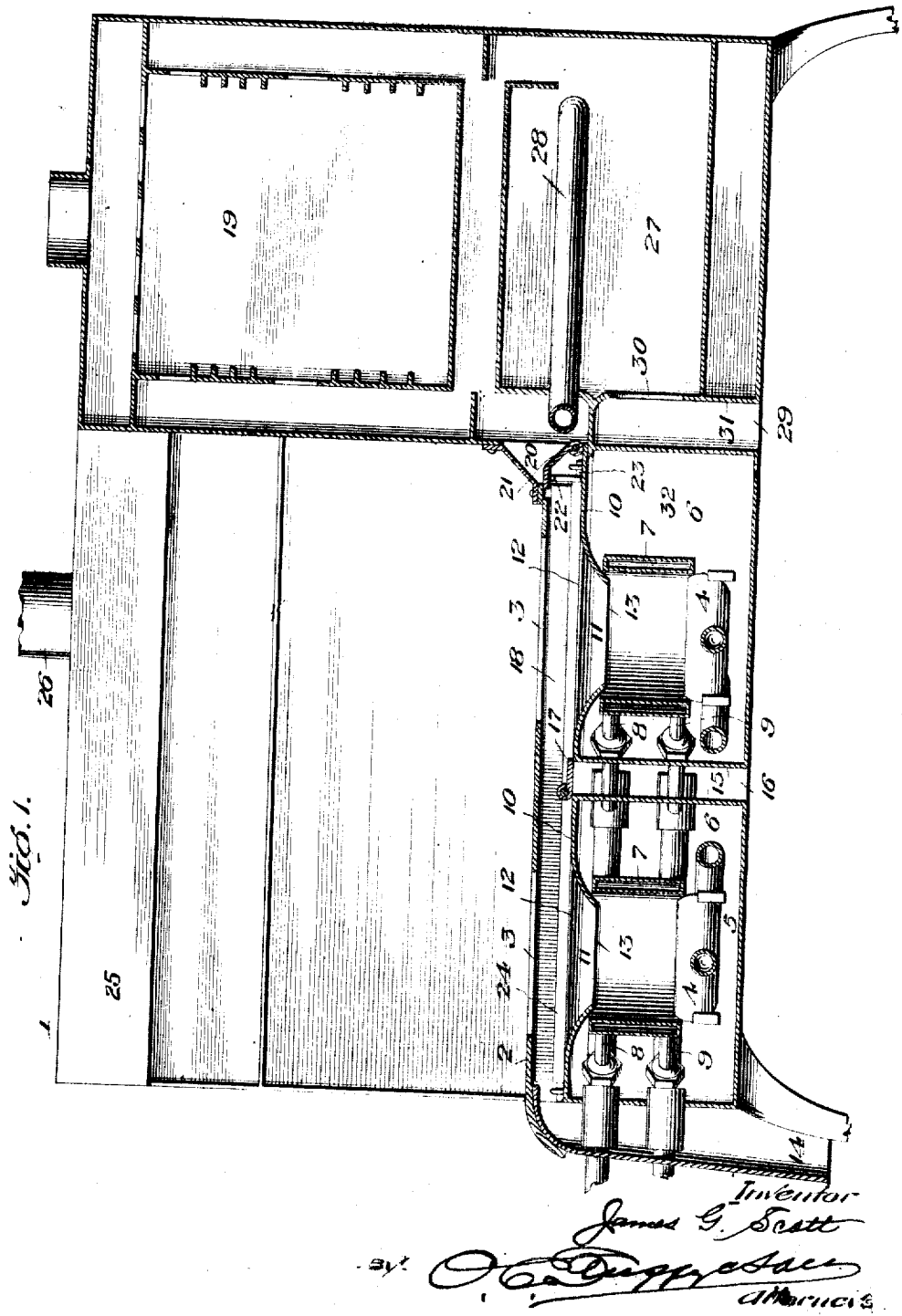
Figure 1 is a vertical longitudinal sectional view through a stove constructed in accordance with this invention.

1 indicates the stove which is provided with the usual flat surface 2 preferably provided with openings 3 to receive the usual stove plates (not shown). The burners 4 are arranged in the manner as shown in the drawings and preferably in pairs, and are positioned above the lower bottom portion 5 of the burner compartment 6. Positioned above the burners 4 in the manner as shown, are the tubular shaped water-backs 7 connected to the source of water supply by pipes 8 and 9, so as to effect a circulation of water within the water-backs receiving heat from the burners 4. Arranged above the burners 4 and water-backs 7 is a horizontal partition 10 having a slightly depressed annular portion 11 surrounding an opening 12 therein, the edge 13 of the depressed portion 11 slightly depending within the annular water-backs 7 in the manner as shown in Fig. 1.

In arranging the burners in the manner as shown in the accompanying drawings, I provide a draft opening 14 preferably at the end of the stove opposite to that of the oven, and I provide intermediate each pair of burners two vertical transverse walls or partitions 15 spaced from each other so as to provide a further draft opening 16. At the top of this draft opening 16 and preferably at the horizontal partitions 10 I provide a damper 17 commanding said draft openings 16 so that when said damper 17 is raised into a vertical position it will effectually provide a transverse closure across the space or opening 18 between the partitions 10 and the cooking stove surface 2 between each pair of burners so as to prevent the passage of heat from the end pair of burners passing beyond the damper 17.

Figure 3:
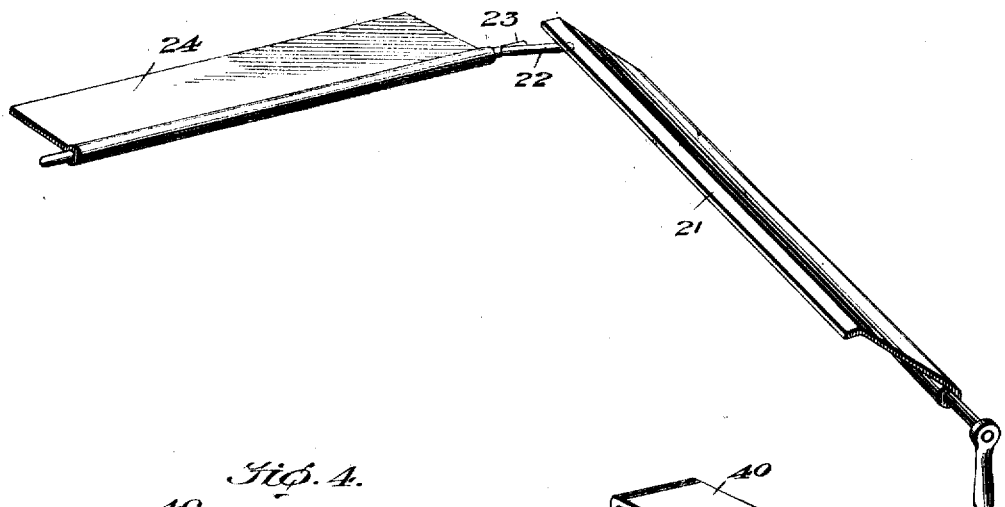
Fig. 3 is a perspective view of the compound damper.

19 indicates the oven which connects with the space 18 under the stove cooking surface 2 by means of the passage 20, and transversely of the stove, and at the point of connection between the oven section and the stove proper, I provide a damper 21 as shown in Fig. 1 and as illustrated in detail in Fig. 3, said damper 21 having its inner end in connection with an arm 22 arranged on the shaft 23 of the pivoted longitudinal damper 24, said damper 24 extending the entire length of the stove at the back thereof so as to open and close communication between the space 18 under the stove-surface 2 and an exhaust heat drum 25 which is piped at 26 to the outer atmosphere.

From an inspection of Fig. 1 taken in connection with Fig. 3, it will be seen that when the damper 21 is in a raised position, as shown in Fig. 1, thus cutting-off communication between the oven section and the stove proper, the damper 18 will lie in a lowered or horizontal position as shown in Fig. 3, so as to effect communication between the space or chamber 18 and the exhaust or waste heat drum 25. When, however, the oven heat commanding damper 21 is in a lowered or opened position connecting communication between the space or chamber 18 and the oven, the arm 22 of the damper 24 is depressed, which raises the damper 24, closing communication between the space or chamber 18 and the waste heat drum 25, thus allowing all heat from the burners under the cooking surface 2 to pass through the passage 20 and into the oven section 19.

Referring particularly to the oven section 19 it will be seen that I provide in the lower section 27 an independent burner 28 to be used for heating the oven when it is not desired to operate the usual stove burners 4, and from Fig. 1 it will be seen that I provide a draft opening 29 which communicates with an opening 30 in the wall 31 allowing atmospheric air to pass under the burner 28 where it is heated and from the lower section 27 passes under and around the oven 19. By means of this construction, the oven 19 can be very quickly raised to a baking or broiling temperature, while a more perfect combustion of the fuel and a more efficient circulation of the heated air is effected.

The burner chambers 6 are provided with openings 32 at their rear portions in communication with the waste heat drum 25 so that any carbon monoxid which may be generated by reason of the contact of the flame of the burners with the relatively cool surface of the water-backs 7, is deflected by the depending portions 11 of the horizontal partitions 10 and passes from the burner chambers 6 out through the pipe 26 to the atmosphere.

Having thus described the several parts of this invention, its operation is as follows:

When it is desired to employ the stove for simple cooking purposes, the transverse damper 21 is raised in position shown in Fig. 1, which allows the heat passing from the burners 4 into the space or chamber 18 to pass through the opened damper 24 into the waste heat drum 25 and thence to the atmosphere. When it is desired to use one or both of the endmost burners 4 for simple cooking purposes, the intermediate damper 17 may be raised which confines the heat from the burners 4 directly under its effective cooking space and prevents the circulation of heat under the entire stove surface 2. When, however, it is desired to utilize the oven in conjunction with the usual burners 4, the intermediate damper 17 is closed, as shown in Fig. 1, while the damper 21 is opened, thus allowing an efficient draft to pass through the draft opening 15 and longitudinally of the stove through the space or chamber 18 into the passage 20, and thence to the oven, it being understood, as heretofore described, that the longitudinal damper 24 is raised and closed when the transverse damper 21 is opened. Thus all of the heat from the burners and within the space or chamber 18 is directed into the oven and caused to circulate rapidly and efficiently under influence of the draft opening 14. When, however, it is desired to utilize the oven and at the same time employ one or more of the cooking burners, damper 17 is raised and the intermediate damper 17 is raised and the heat from one or both of the central pair of burners is directed through the space or chamber 18 into the oven, the central damper 17 preventing distribution of the heat throughout the entire space or chamber 18, while at the same time the damper 17 opens the draft opening 16 so as to provide an efficient draft for the rapid circulation of heat from the burner or burners into and around the oven.

As heretofore mentioned, the oven can be utilized for baking or broiling purposes when it is not necessary to use the cooking burners and by reason of the draft opening 29 and the opening 30 below the burner, an efficient draft is provided which causes a rapid circulation of the heated air from the burner section of the oven into and around the oven section proper.

Figure 2:
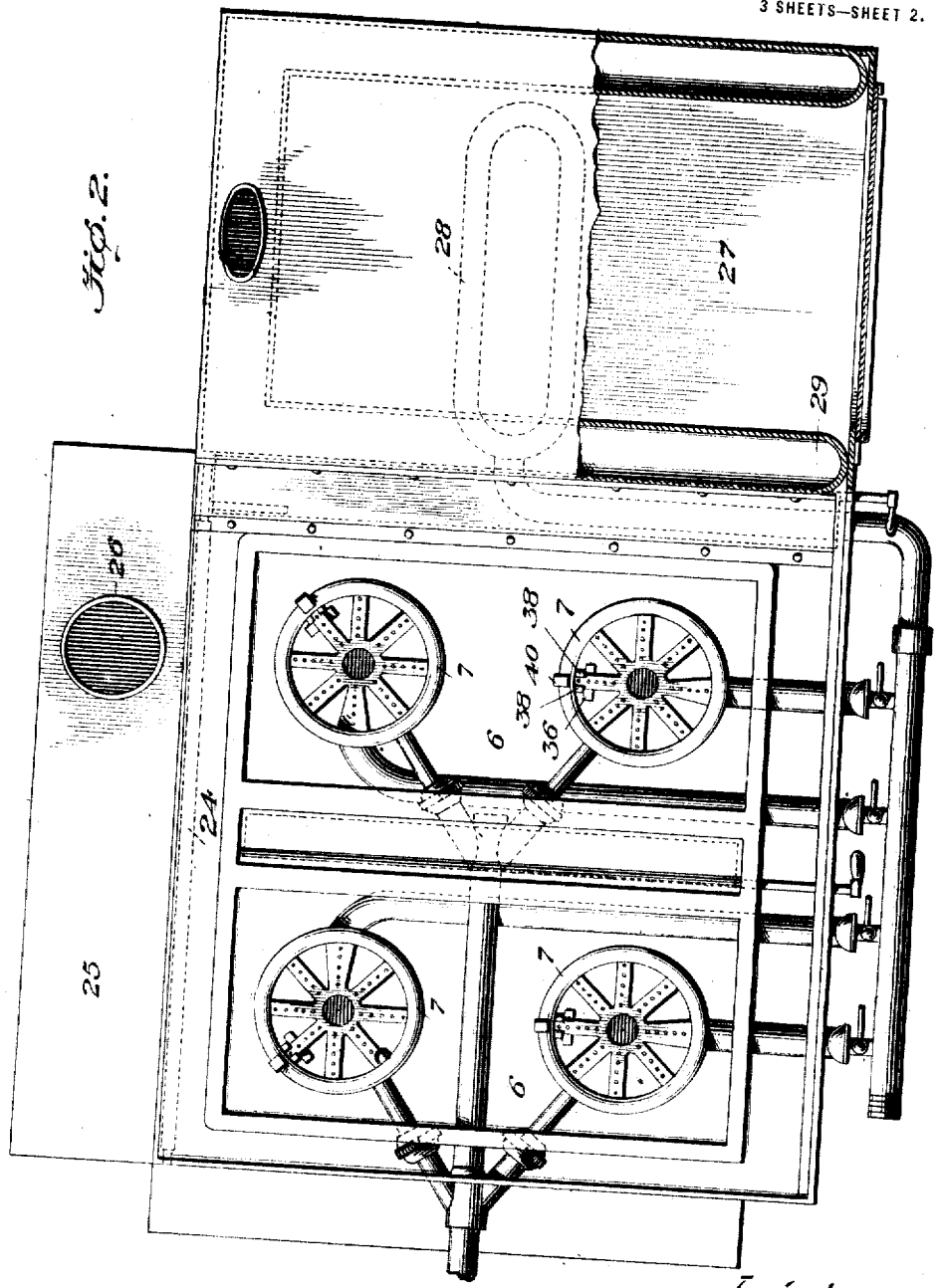
Fig. 2 is a top plan view partly in section.
Figure 4:
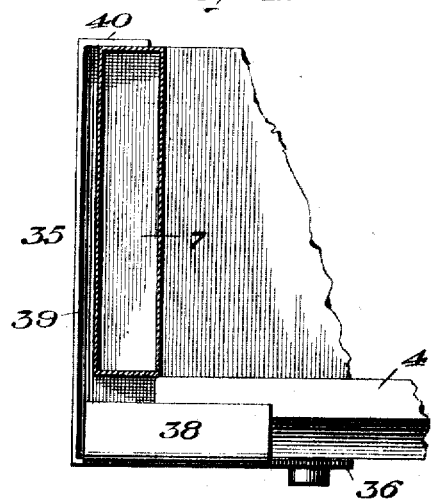
Fig. 4 is a fragmentary elevation partly in section illustrating the burner supporting bracket.
Figure 5:
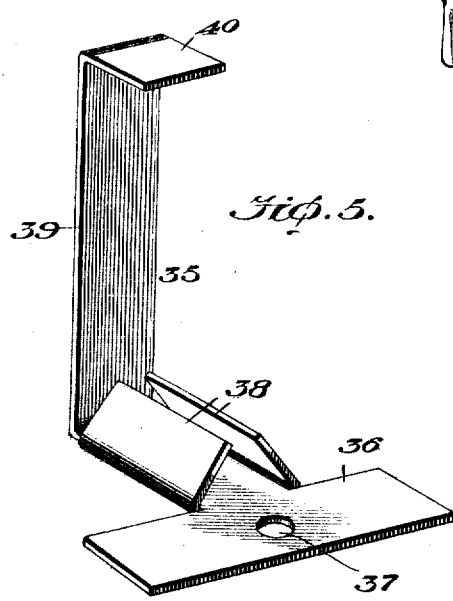
Fig. 5 is a perspective view of the same.

Referring to Figs. 4 and 5 which illustrate in detail the burner bracket; it will be understood that the burners 4 are capable of removal from the stove for cleaning or other purposes, and in order to effectually hold and support the burners in proper position with relation to the water backs 7, I form the burner supports 35 preferably of sheet metal having a horizontal supporting portion 36 preferably apertured at 37 and with the upturned converging portions 38 to receive one star or arm of the burner in the manner as is also illustrated in Fig. 2, the vertical portion 39 of the support terminating in a horizontal end portion 40 to extend over and engage the top surface of the water backs 7 in the manner as shown in Figs. 2, 4 and 5.

By means of this construction the burners 4 are capable of ready removal from the stove and can be quickly replaced by slipping the flat horizontal end 40 of the support 35 off and on the top surface of the water backs 7.

From the foregoing description taken in connection with the accompanying drawings, it will be seen that practically all of the heat from the burners 4 can be utilized, first for the usual cooking purposes, secondly for the efficient and ready heating of water for domestic purposes and thirdly for efficient heating of the oven for baking purposes, while at the same time provision is made for disposing of the heat from one or all of the burners when the same is not desired for use for heating the oven, thus making it possible to employ the stove during the warm season without unduly heating the room in which the stove is being operated. It will further be seen that this construction provides for the quick and ready elimination of any noxious gas such as carbon monoxid from the stove to such a perfect extent that no trace of carbon monoxid can be detected even when the stove is in full operation.

Having thus fully described the invention, what I claim as new and desire to secure by Letters Patent of the United States, is—

1. A stove of the character described including burner compartments, a burner for each compartment, a water-back disposed in relation to said burner to receive heat therefrom, a plate or partition forming the top of each compartment, said plate or partition being apertured above the said burner to provide for the passage of heat therethrough, a compartment above the said plates or partitions and directly under the cooking surface of the stove, the stove being provided with a draft opening in communication with said last mentioned compartment above one of the burner compartments and its burner, the stove being provided with a second and independent damper opening in communication with the compartment above the said partitions or plates to provide draft to the last mentioned compartment above the other of said burner compartments and its burner, a damper for commanding the last mentioned draft opening and for dividing the said compartment under the cooking surface of the stove transversely thereof, an oven section in communication with the said compartment under the cooking surface of the stove to receive heat therefrom, a damper for closing communication between the oven section and said last mentioned compartment, a waste heat flue in communication with the compartment under the cooking surface of the stove and a damper for closing communication between the waste heat flue and the last mentioned compartment substantially as described and for the purposes set forth.

2. A stove of the character described including burner compartments, a burner in each compartment, a water-back in association with each burner to receive heat therefrom, the top of each compartment being apertured above its burner for the passage of heat therethrough, a compartment directly above the burner compartment and between the same and the cooking surface of the stove, the stove being provided with independent draft openings in communication with the last mentioned compartment to provide drafts to the last mentioned compartment independently above each of the burner compartments, an oven section in communication with the compartment directly under the cooking surface of the stove, the stove being provided with a waste heat flue, a damper for closing communication between the oven section and the compartment under the cooking stove surface and a damper for closing communication between the waste heat flue and the said compartment under the cooking stove surface, substantially as described.

3. A stove of the character described, including burner sections, a burner in each of said sections, the top plate or partition of each section being apertured above each burner to provide for the passage of heat therethrough, a compartment above the burner compartments to receive heat therefrom, said last mentioned compartment being located directly under the cooking surface of the stove, the stove being provided with a draft opening in communication with the said compartment directly under the cooking surface of the stove, a damper transversely of the last mentioned compartment for dividing the said last mentioned compartment, an oven section in communication with the last mentioned compartment, a damper commanding said communication, the stove being provided with a waste heat flue in communication with the compartment directly under the cooking surface of the stove and a damper commanding said communication between the waste heat flue and the last mentioned compartment, substantially as described and for the purposes set forth.

4. A stove of the character described including a burner compartment, a burner therein, a water-back in association with said burner to receive heat therefrom, the top of said compartment being apertured to provide for the passage of heat therethrough, a compartment above said burner compartment to receive heat from the burner, the stove being provided with a draft opening for the last mentioned compartment independent of the draft to the burner, an oven section in communication with the last mentioned compartment, a burner in the oven section, said oven section being provided with a draft opening to provide a draft under the said burner to effect a circulation of heat through the oven, substantially as described and for the purposes set forth.

5. A stove of the character described including a burner compartment, a burner therein, a water-back in association with said burner to receive heat therefrom, a compartment above said burner compartment, the last mentioned compartment being located directly under the cooking surface of the stove, an oven section in communication with the last mentioned compartment, the stove being provided with a draft opening in communication with the last mentioned compartment independent of the draft to the burner, a damper for commanding communication between the oven section and the last mentioned compartment, the stove being provided with a waste heat flue in communication with the last mentioned compartment, and a damper for commanding communication between the waste heat flue and the last mentioned compartment, substantially as described and for the purposes set forth.

6. A stove of the character described, comprising burner compartments separated from one another by an inclosed vertical space forming a draft opening, a plate or partition forming the top of each compartment and having openings above the burners to provide for the passage of heat elements, a horizontal compartment above said plate provided with a draft opening, said vertical space being adapted at its upper end to communicate with said horizontal compartment, and a releasable closure element for said vertical space.

7. A stove of the character described, comprising burner compartments separated from one another by an inclosed vertical space forming a draft opening, a plate or partition forming the top of each compartment and having openings above the burners to provide for the passage of heat elements, a horizontal compartment above said plate provided with a draft opening, said vertical space being adapted at its upper end to communicate with said horizontal compartment, and a releasable closure element for said vertical space, said closure element being arranged adjacent the top of said vertical space and adapted when in open position to form a vertical partition separating the horizontal compartment into two compartments.

8. A stove of the character described, comprising opposed burner compartments separated from one another by partitions forming a vertical space having an opening leading to the outside, a horizontal compartment disposed above the burner compartment and common to both compartments, a main air supply leading from the outside to said horizontal compartment, and a movable closure wall for the vertical space, said closure wall being adapted to be moved so as to establish communication between said vertical space and that portion of the horizontal compartment above one burner and adapted at the same time to separate the horizontal compartment into two sections.

9. A stove of the character described, comprising a plurality of burner compartments, a horizontal space co-extensive with the compartments and common to both, an air supply conduit communicating with the horizontal compartment above one burner compartment, a supplementary air supply conduit communicating with the horizontal compartment adjacent to the other burner compartment and a movable closure for one of said air supply conduits, said closure being adapted to move from a position closing communication between its air conduit and the horizontal compartment to a position separating the horizontal compartment into two sections one of which is in communication with one air conduit and the other with the other air conduit.

10. A stove of the character described, comprising a plurality of burner compartments, a horizontal space co-extensive with the compartments and common to both, an air supply conduit communicating with the horizontal compartment above one burner compartment, a supplementary air supply conduit communicating with the horizontal compartment, adjacent to the other burner compartment and a movable closure for one of said air conduits, said closure being adapted to move from a position closing communication between its air conduit and the horizontal compartment to a position separating the horizontal compartment into two sections which latter are in communication respectively with the aforesaid air supply conduits.

11. A stove of the character described, comprising a plurality of burners disposed under the cooking surface of the stove, said plurality of burners being arranged in relation to the cooking surface of the stove to provide a horizontal compartment between the burners and the cooking surface of the stove, said horizontal compartment being provided with a damper controlled draft opening in communication with the atmosphere, and being further provided with an auxiliary draft opening in communication with the atmosphere disposed between two of the said burners, and an oven in communication with the said horizontal compartment to receive heat therefrom.

In testimony whereof I affix my signature in presence of two witnesses.

JAMES G. SCOTT.

Witnesses:
C. Hugh Duffy,
Florence A. Barron.